(12) United States Patent
Jennings et al.

(10) Patent No.: US 6,430,352 B1
(45) Date of Patent: Aug. 6, 2002

(54) APPARATUS AND METHOD OF TESTING OPTICAL NETWORKS USING ROUTER MODULES

(75) Inventors: Mark R. Jennings, Andover; Frank S. Leone, Berkeley Heights; Richard J. Pimpinella, Hampton, all of NJ (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/532,296

(22) Filed: Mar. 23, 2000

(51) Int. Cl.$^7$ .................................................. G02B 6/28
(52) U.S. Cl. ......................... 385/147; 385/24; 359/110; 356/73.1
(58) Field of Search ........................ 359/110; 356/73.1; 385/24, 147

(56) References Cited

U.S. PATENT DOCUMENTS 5,367,394 A * 11/1994 Chuter et al.
5,903,367 A * 5/1999 Moore

* cited by examiner

*Primary Examiner*—Hung N. Ngo
(74) *Attorney, Agent, or Firm*—Gibbons, Del Deo, Dolan, Griffinger & Vecchione

(57) ABSTRACT

A apparatus and method for testing portion of an optical fiber network from various remote stations without having to have optical testing equipment at those remote stations. The system and method utilize a series of routers that are located at the central office and the remote stations of an optical fiber network. The routers are interconnected through a common optical pathway that is part of the optical fiber network. Testing equipment is located at the central office of the optical fiber network. Optical testing signals and command signals are forwarded to the router at the central office. The router at the central office multiplexes the signals and forwards the signals as an optical transmission passing between the central office and a remote station. The router at the remote station removes the multiplexed signal from the optical transmission. Once removed, the optical test signals and command signals are utilized at the remote station to test at least a portion of the optical fiber network from that remote station.

15 Claims, 5 Drawing Sheets

APPARATUS AND METHOD OF TESTING OPTICAL NETWORKS USING ROUTER MODULES

BACKGROUND OF THE INVENTION

1. Field of the Invention

The present invention relates to an apparatus and method for testing and monitoring an optical fiber network from a central station using a single set of testing and monitoring equipment.

2. Description of the Prior Art

There are many applications that utilize an optical fiber network to establish communication links between a host digital terminal (HDT) at a central office and an optical network unit (ONU) at a remote location. Rarely does a single fiber extend the full length between the HDT and the ONU without disruption. Rather, optical fiber networks contain many remote stations between the HDT and the ONU. At the various remote stations, optical signals are regenerated to compensate for transmission losses that occur in the optical fibers. Furthermore, remote stations are also used as splicing stations where different optical fiber cables are spliced together.

Many remote stations in an optical fiber network are unmanned and operate in a fully automated fashion. At such remote stations, automated operations are controlled by a fiber administration system that organizes the various optical fibers that lead into, and away from, the remote station. The fiber administration system contains a station systems controller that is the computer control for the fiber administration system.

In the fiber administration system, the various optical fibers are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein.

A primary piece of equipment used to test and characterizes optical pathways in an optical fiber network is an optical time domain reflectometer (OTDR). OTDR are not only capable of characterizing the transmission qualities of an optical pathway, they also are capable of determining where in an optical pathway a fatal defect has occurred. Because of their versatility, it is desirable to have an OTDR at every remote station in an optical fiber network. However, OTDRs are very expensive. For that reason, it is not practical to buy an OTDR for each remote station. Rather, it is more cost effective to periodically dispatch a technician to the various remote stations with an OTDR. Once at a remote station, the technician can attach to OTDR to the various optical fibers and perform the required testing.

Dispatching technicians to remote stations to manually connect and disconnect test equipment is an expensive and time consuming endeavor. If a technician is sent to a remote location to test for the location of a broken optical fiber, it may be several hours before the exact location of the broken optical fiber can be located.

A need therefore exists for an apparatus and method whereby a single set of testing equipment can be used to test remote stations of an optical fiber network in an automated fashion thereby eliminating the need for redundant testing equipment and technicians who haul and install the redundant test equipment at the various remote stations.

SUMMARY OF THE INVENTION

The present invention is an apparatus and method for testing at least a portion of an optical fiber network from various remote stations without having optical testing equipment at those remote stations. The apparatus and method utilize a series of routers that are located at the central office and the remote stations of an optical fiber network. The routers are interconnected through a common optical pathway that is part of the optical fiber network. Testing equipment is located at the central office of the optical fiber network. Test signals and command signals generated by the test equipment and fiber administration system at the central office are directed to the router module at the central office. The router at the central office multiplexes these signals and forwards these signals into the optical fiber network.

The router at the remote station removes the multiplexed signal from the optical fiber network. Once removed, the test signals and command signals are utilized at the remote station to test at least a portion of the optical fiber network from that remote station. The router at the remote station provides the required testing signals even though no testing equipment is physically present at the remote location.

BRIEF DESCRIPTION

For a better understanding of the present invention, reference is made to the following description of an exemplary embodiment thereof, considered in conjunction with the accompanying drawings, in which.

DETAILED DESCRIPTION

The present invention system utilizes a series of router modules to interconnect the test equipment at the central office to the fiber administration systems at the various remote stations. The router modules at the central office and at the remote stations are connected to a common optical pathway that is part of the optical fiber network. By creating a direct optical link between the fiber administration system at the central office and the fiber administration office at the remote stations, optical test signals generated by the test equipment at the central office can be forwarded to the remote stations. Once received at the remote stations, the optical test signals can be utilized as if they were generated at the remote station.

Figure 1:
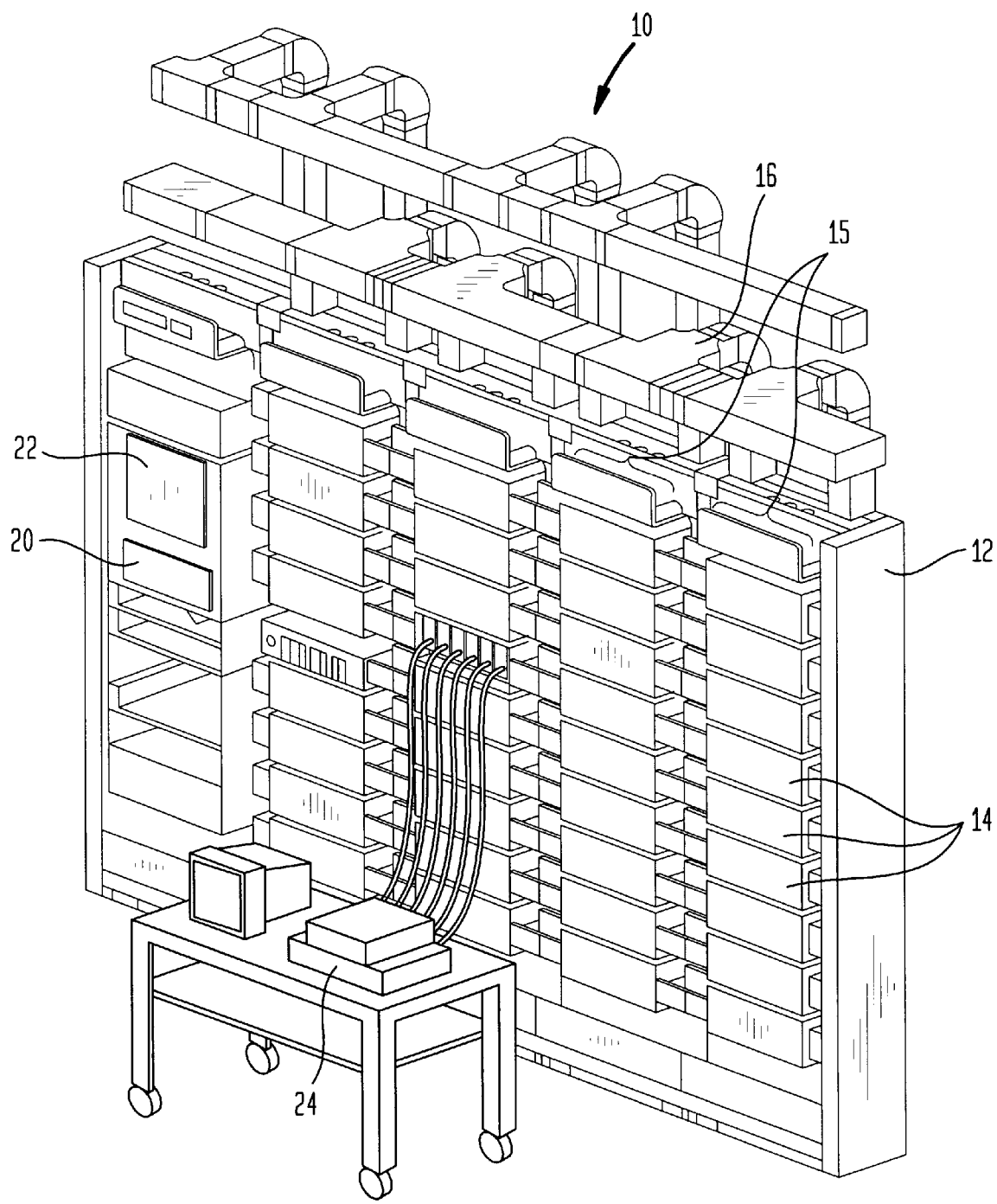
FIG. 1 is a perspective view of an optical fiber administration system containing a first plurality of bays and a second plurality of fiber distribution shelves in each bay.

In FIG. 1, an exemplary fiber administration system 10 is shown of the type that is located at the central office in many optical fiber networks. The exemplary fiber administration system 10 includes an optical fiber distribution frame 12 that is affixed in a set position to the floor of the station. The fiber distribution frame 12 defines a plurality of bays 15. Each bay 15 is a vertical structure that supports a plurality of fiber distribution shelves 14. The fiber distribution shelves 14 come in one of three standard sizes, having a five inch height, a seven inch height or a nine inch height. A network of conduits 16 lead the various optical fibers from the optical fiber network to the fiber distribution shelves 14. Each of the fiber distribution shelves 14 contains connection ports (not shown) that are interconnected by patch cords that extend throughout the fiber administration frame 12.

In addition to the fiber distribution shelves 14, the fiber administration system 10 can also include a station systems controller 20. If present, the station systems controller 20 runs the electronic operations of the fiber administration system 10 through a local area network (LAN). The station systems controller 20 has a display 22 as is typical for computer control systems.

Located within the frame of the fiber administration system 10 may be test equipment that is used to test and monitor the integrity of the various optical fibers that terminate at the fiber administration system 10. However, in the shown embodiment, the test equipment 24 is selectively attached to the fiber administration system 10 by wheeling the test equipment 24 to the fiber administration system 10 on a cart and manually attaching the test equipment 24 to the fiber administration system 10 with leads.

The test equipment 24 may be incorporated into the fiber administration system 10 or connected to the fiber administration system 10 and can include any equipment used to test or monitor optical fibers in an optical fiber network. Preferably, the test equipment 24 includes an OTDR.

Figure 2:
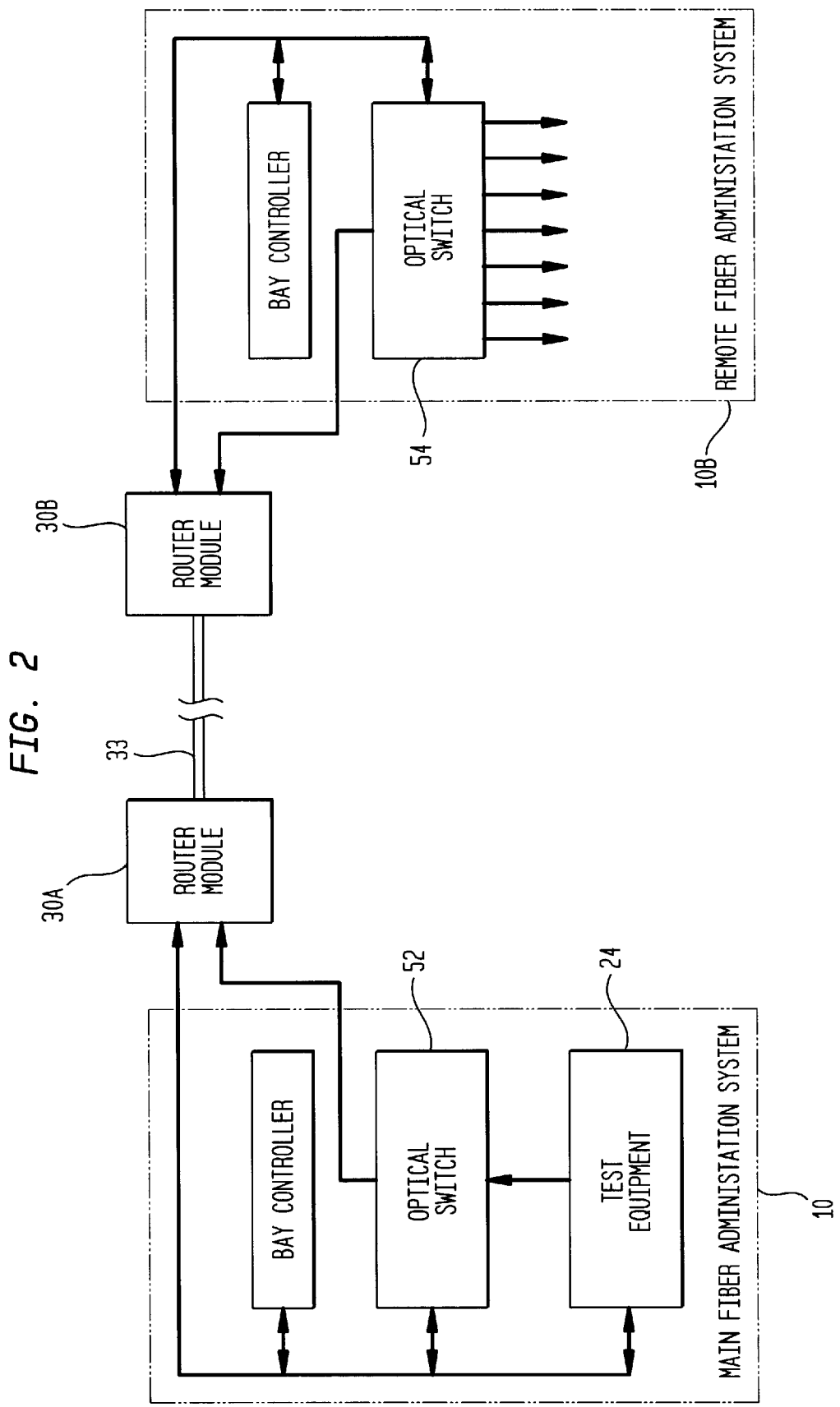
FIG. 2 is a schematic view of an optical fiber system in accordance with the present invention.

Referring now to FIG. 2, it can be seen that to utilize the present invention, test equipment 24 is connected to the fiber administration system 10 at the central office. The test equipment may be part of the fiber administration system, as is shown in FIG. 2, or may be connected to the fiber administration system from a cart, as is shown in FIG. 1.

At the central office and at each of the remote stations is located a router module 30A, 30B. The router modules 30A, 30B are all connected to a common optical pathway that of part of the optical fiber network 33.

The test equipment 24 located at the central office generates optical test signals. Optical test signals are received into the router module 30A. If multiple pieces of test equipment are being used, a primary stage optical switch 52 can be used to selectively direct different optical test signals to the router module 30A at different times.

Figure 3:
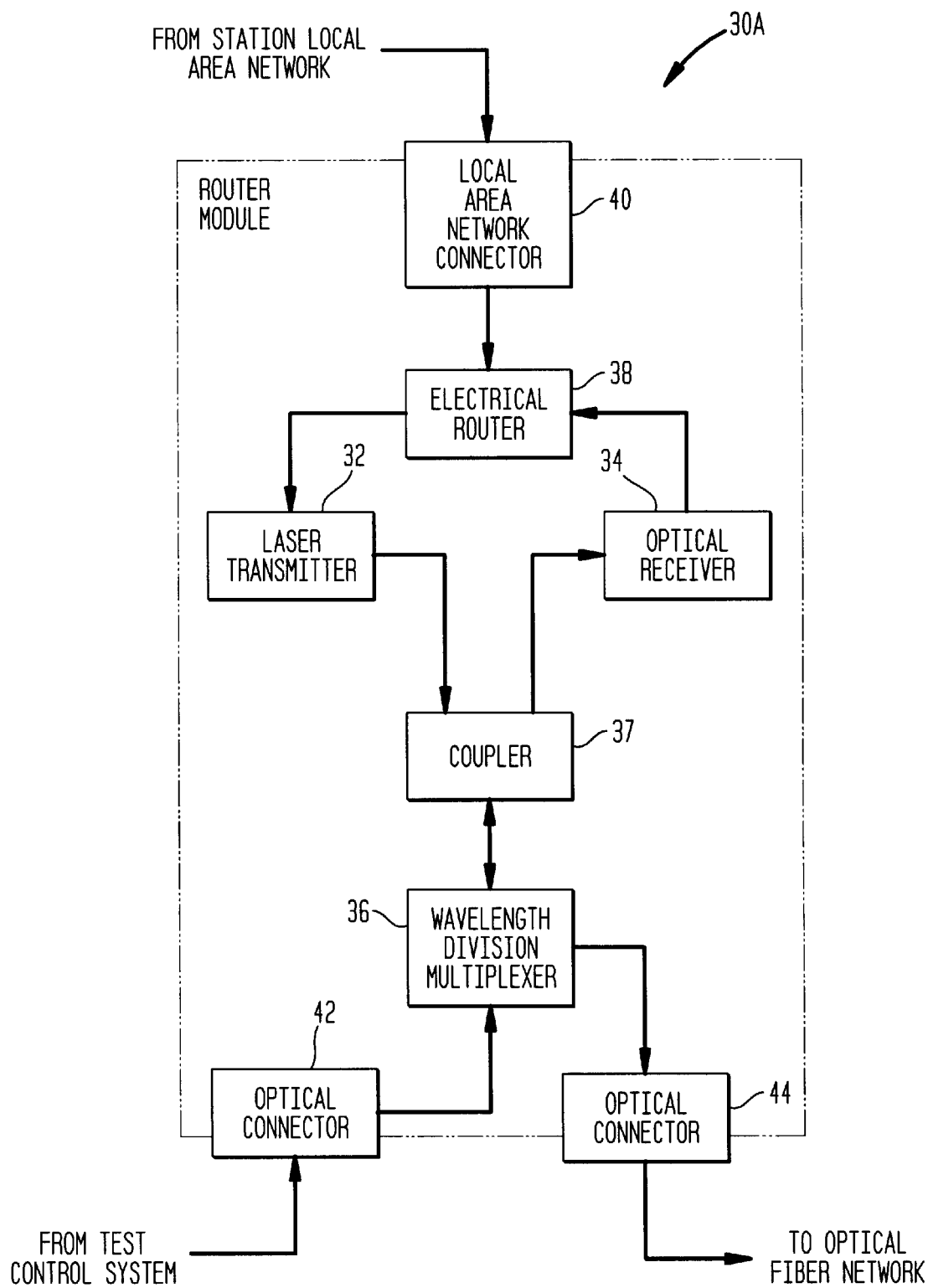
FIG. 3 is a schematic view of a routing module at the central office.

Referring to FIG. 3, it can be seen that the router modules 30A is an assembly that contains a laser transmitter 32 to transmit optical signals and an optical receiver 34 to receive optical signals. The router module 30 also contains an electrical router 38 that utilizes the local area network (LAN) protocols used by the fiber administration system of the station in which the router module is located.

The router module 30A contains a bi-directional LAN connector port 40 that interconnects with the local area network of the fiber administration system at that location. The router module 30A sends and receives signals from the local area network through the LAN connection port 40.

FIG. 3 shows the first router module 30A which is disposed at the central office of the fiber administration system. Other router modules are positioned at each of the remote stations that are connected by the optical fiber network 33 (FIG. 2). The router module 30A at the central office receives optical test signals from the test equipment 24 (FIG. 2), through its first optical connector port 42. The optical test signals are directed to the second optical connector port 44 and are unchanged by the router module 30A.

Command signals from the local area network at the main office are received by the router module through the bi-directional LAN connector port 40. Once a command signal from the local area network is received through the bidirectional LAN connector port 40, the signal is directed as a command signal, through the electrical router 38 to the laser transmitter 32. The laser transmitter 32 transmits an optical signal that corresponds to the received command signal. The optical signal generated by the laser transmitter 32 is produced at a wavelength that is not used by optical signals of the test equipment 24 (FIG. 2). The newly generated optical signal passes through an optical coupler 37 and enters the wavelength division multiplexer 36. The wavelength division multiplexer 36 multiplexes the newly generated optical signal with the optical test signals of the test equipment and forwards the multiplexed signal into the optical fiber network 33 (FIG. 2).

The output of the wavelength division multiplexer 36 is directed to a second optical connector 44 on the router module 30A. The second optical connector 44 is connected to a selected optical pathway in the optical fiber network 33 (FIG. 2). As a result, the transmission carried by that optical pathway in the optical fiber network 33 (FIG. 2) includes the optical test signals of the test equipment and the optically converted command signals.

Figure 4:
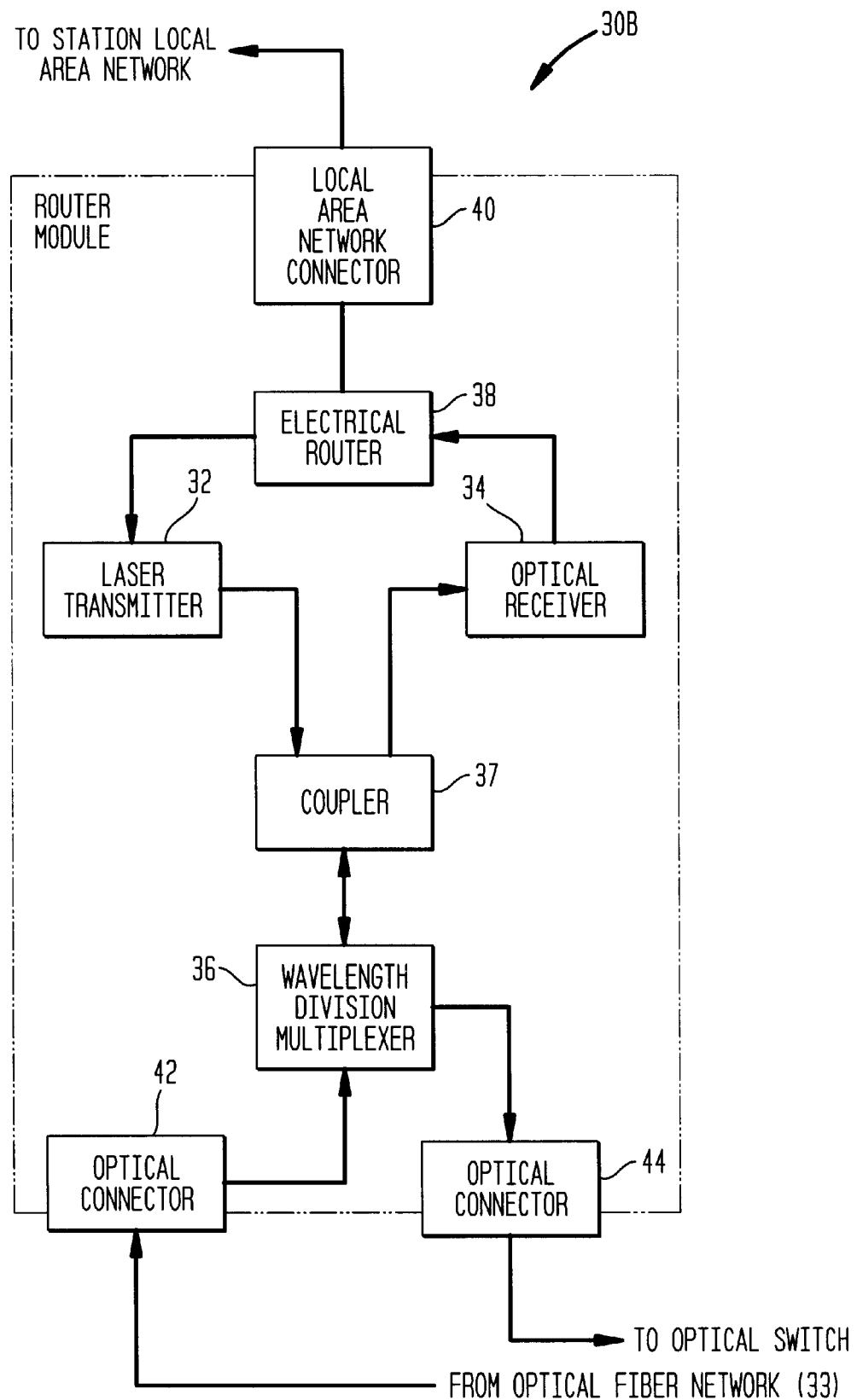
FIG. 4 is a schematic of a routing module at a remote office.

Referring now to FIG. 4, a router module 30B is shown receiving a signal from the router module at the central office via the optical fiber network 33 (FIG. 2). The router module 30B is connected to the optical fiber network 33 (FIG. 2) via a first connector port 42. The signal received by the first connector port 42 includes the optical test signals from the test equipment at the central office and the converted command signals. The combined signal is directed to the wavelength division multiplexer 36. The wavelength division multiplexer 36 removes the command signals from the optical test signals and leaves the optical test signals unaffected. The optical test signals exit the second connector port 44 of the router module unaffected where they are directed to an optical switch 54 (FIG. 2) at the remote station.

The command signals removed by the wavelength division multiplexer 36 are converted into corresponding electrical signals. The electrical command signals are received into the electrical router 3 8 and are read into the local area network at that location through the bidirectional LAN connection port 40.

It should be understood that the transmission process illustrated by FIG. 3 and the receiving process illustrated by FIG. 4 can be performed by a signal router module 30 simultaneously. The use of the bi-directional LAN router connector 40 enables the router module 30 to simultaneously send and receive signals from the local area network at the location of that router module 30. Additionally, the use of the optical coupler 37 enables the wavelength division multiplexer 36 to simultaneously add and remove multiplexed signals to and from the optical fiber network 33.

Whether the optical signals sent from the router module 30A were originally test signals or command signals, the signals are sent through the optical fiber network 33 to the various remote stations. Once at the appropriate remote station, the signals signal are separated by the wavelength division multiplexer 36 (FIG. 2) contained within the router module 30B at that remote station.

Once the test signals and command signals are separated by the wavelength division multiplexer, the optical test signals can be utilized directly at the remote station. The command signals are received by the electrical router of the router module 30B at the remote station and are used to administer the optical test signals.

If the optical test signals received by the router module 30B at the remote station are to be used directly, the router module 30B itself acts as the source of the optical test signals. If the router module 30B at a remote station is receiving signals from an OTDR at the main office, the router module 30B acts as a virtual OTDR at the remote station. The OTDR signals coming from the router module can be forwarded to an optical switch 54 within the fiber administration system of the remote station and can be used to test and quantify all optical fibers connected to that remote station.

Accordingly, by using the router modules 30A, 30B, most any piece of testing equipment, either electrical or optical can be virtually recreated at a remote station through the use of the router module network. Consequently, a test equipment 24 at the central office can be used to service a plurality of stations and the central office without redundance and without having to physically bring testing equipment to the remote stations.

By conducting testing at the various remote stations through the router module network, the location of damaged fibers can be more quickly ascertained and most all testing can be performed in an automated fashion.

Figure 5:
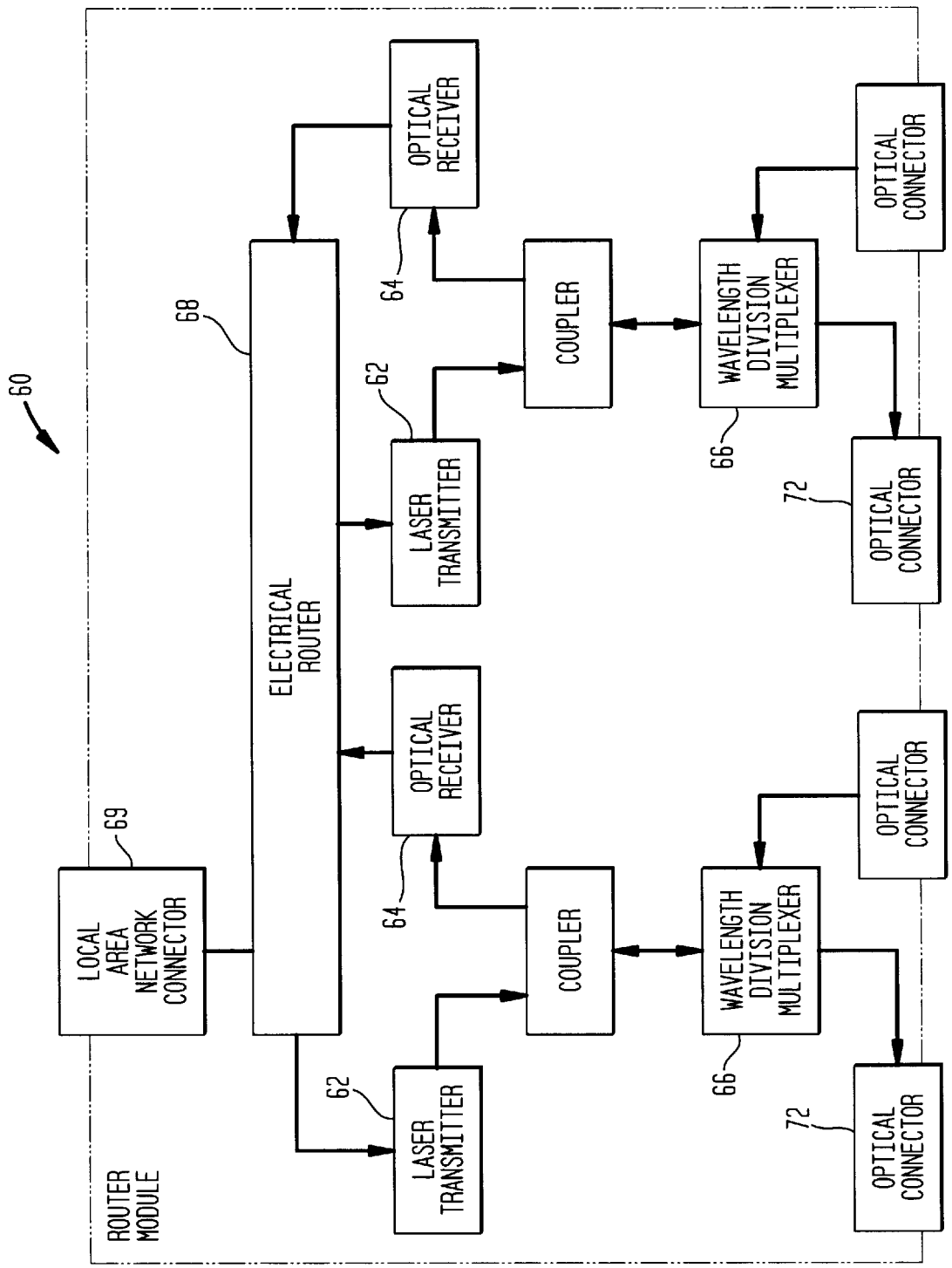
FIG. 5 is a schematic view of an alternate embodiment of a routing module in accordance with the present invention.

Referring to FIG. 5, an alternate embodiment of a router module 60 is shown. In this embodiment, the router module 60 contains a plurality of laser transmitters 62, a plurality of optical receivers 64 and a plurality of wave division multiplexers 66. The router module 60, however, only contains a single electrical router 68 that utilizes the local area network (LAN) protocols used by the fiber administration system of station in which the router module 60 is located.

The router module 60 contains a bidirectional LAN connector port 69 that interconnects with the station systems controller of the fiber administration system at the location of the router module 60. The router module 60 receives signals from the station systems controller through the LAN connection port 69.

Each wavelength division multiplexer 66 is coupled to a laser transmitter 62 and an optical receiver 64. The router module 60 has an optical connector ports 72 ,74 connected to each wavelength division multiplexer 66. The router module 60 is used at remote stations where optical test signals and command signals are to be relayed to other remote stations at other points in the optical fiber network.

The use of multiple wavelength division multiplexers 66, multiple optical receivers 64 and multiple laser transmitters 62, also enables the router module 60 to communicate with other router modules using multiple different optical pathways in an optical fiber network. As such, the router module 60 can receive optical signals from different pieces of test equipment simultaneously. Alternatively, the router module 60 can receive and/or send signals from different router modules at the same time.

It will be understood that the embodiment of the present invention specifically shown and described is merely exemplary and that a person skilled in the art can make alternate embodiments using different configurations and functionally equivalent components. All such alternate embodiments are intended to be included in the scope of this invention as set forth in the following claims.

What is claimed is:

1. In an optical fiber network having a plurality of stations optically interconnected via at least one optical pathway, wherein each station has an associated local area network operable to produce command signals and test equipment operable produce to optical test signals, an apparatus for testing at least a portion of the optical fiber network using the optical test signals comprising:

a router disposed in one of the plurality of stations, the router being electrically coupled to its associated local area network, the optical test equipment and the at least one optical pathway, wherein the router multiplexes the command signals with the optical test signal for transmission via the at least one optical pathway, the router being further configured to receive multiplexed signal and separate the received optical test signals from the command signals, the separated optical test signals being utilized for testing at least a portion of the optical fiber network at a selected location.

2. The apparatus according to claim 1, wherein the router converts the command signals into a corresponding optical signal.

3. The apparatus according to claim 2, wherein the router selectively receives the corresponding optical signal from the at least one optical pathway and converts the corresponding optical signals back into electrical command signals.

4. The apparatus according to claim 2, wherein the router further includes at least one transmitter for converting the command signals into the corresponding optical signals.

5. The apparatus according to claim 1, wherein the router further includes an optical receiver that converts optical signals into corresponding electrical signals.

6. The apparatus according to claim 1, wherein router further includes at least one wavelength division multiplexer that multiplexes the optical test signals with the command signals.

7. The apparatus according to claim 1, wherein the router further comprises at least one wavelength division multiplexer that separates the optical test signals from command signals.

8. An apparatus for forwarding optical test signals from a central office and command signals generated at the central office converted into a corresponding optical signal and multiplexed into an optical transmission to a remote station optically connected by a common optical pathway in an optical fiber network, the apparatus comprising:

a router disposed at the remote station for removing optical test signals from the optical transmission from a common optical pathway, wherein the optical test signals are utilized to test at least a portion of the optical fiber network from the remote station and wherein the router further selectively receives the corresponding optical signal from the common optical pathway and converts the corresponding optical signal back into command signals.

9. The apparatus according to claim 8, wherein the router further includes at least one optical transmitter for converting the command signals into the corresponding optical signals.

10. The apparatus according to claim 8, wherein the router further includes an optical receiver that converts the corresponding optical signals back into the command signals.

11. The apparatus according to claim 8, wherein the router further includes at least one wavelength division multiplexer that removes the optical test signals from the optical transmission.

12. The apparatus according to claim 8, wherein the router performs two way communications with a router at the central office, via the optical fiber network.

13. A method of transmitting optical test signals between a central office cooperatively linked with a router capable of transmitting and receiving optical signals and a plurality of remote stations, at least one of the remote stations being cooperative linked with a router capable of transmitting and receiving optical signals, the routers being interconnected via a common optical pathway in an optical fiber network, the method comprising the steps of:

generating optical test signals and command signals at the central office;

directing the optical test signals and the command signals to the router at the central office;

multiplexing the optical test signals and the command signals to form a combined signal; and transmitting the combined signal through the common optical pathway to the remote stations;

wherein the transmitted optical test signals are recovered at the linked router and test at least a portion of the optical fiber network at a location associated with the at least one of the remote stations.

14. The method according to claim 13, wherein the step of transmitting the optical test signals and the command signals further comprises the steps of:

transmitting the optical test signals through the common optical pathway at a first wavelength; and transmitting the command signals through the common optical pathway at a second wavelength.

15. The method according to claim 13, further comprising the steps of:

converting the command signals into corresponding optical signals;

multiplexing the corresponding optical signals into the common optical pathway; and transmitting the corresponding optical signals to a remote station, wherein the corresponding optical signals are converted back into command signals for use at the remote station.

* * * * *